May 16, 1939.  V. C. HURT  2,158,368
FORMATION DISPLAY DEVICE
Filed Sept. 14, 1935
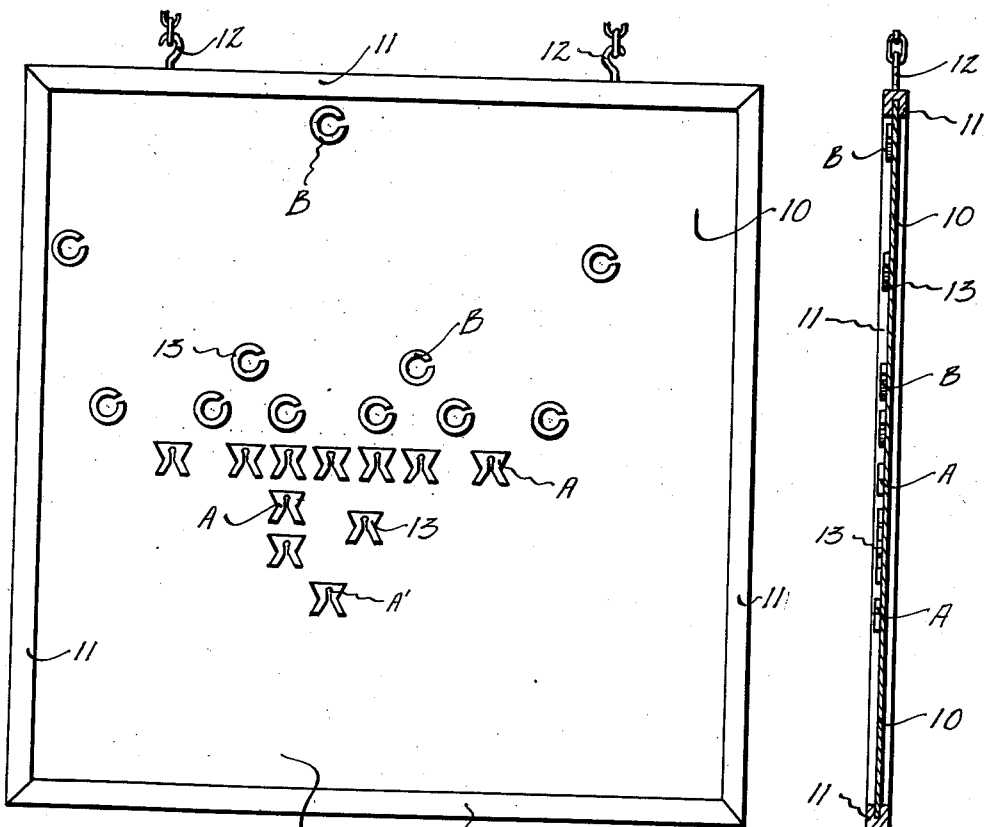
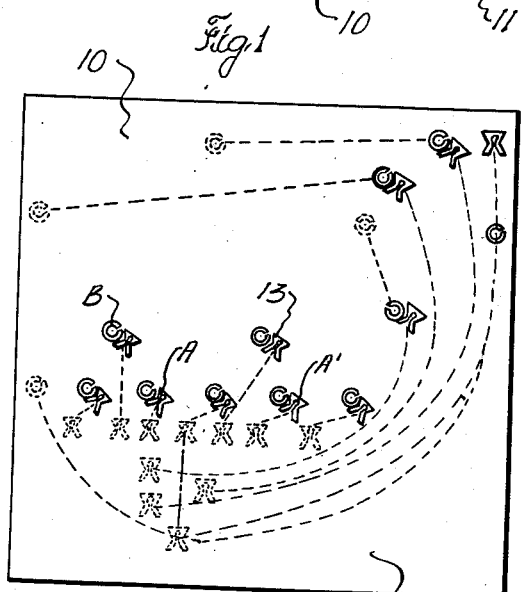
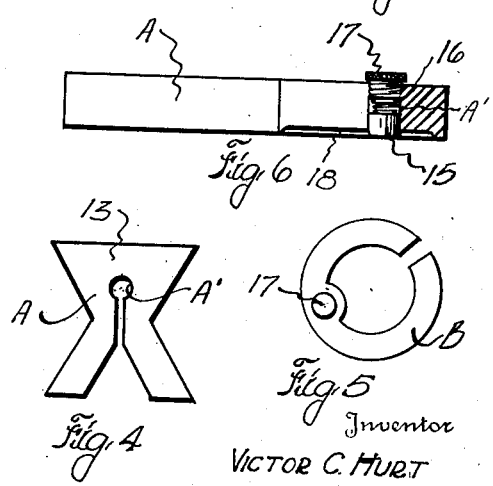
Inventor
VICTOR C. HURT
By Jack Ashley
Attorney Patented May 16, 1939

2,158,368

UNITED STATES PATENT OFFICE 2,158,368

FORMATION DISPLAY DEVICE

Victor C. Hurt, Dallas, Tex.

Application September 14, 1935, Serial No. 40,554

2 Claims. (Cl. 35—29)

This invention relates to new and useful improvements in formation display devices.

One object of the invention is to provide an improved device for displaying, demonstrating or teaching formations, maneuvers, plays, or grouping of the players, men or objects involved in the playing of athletic games, military and naval maneuvers, and other formations.

A particular object of the invention is to provide an improved device particularly adapted for use in demonstrating and teaching proposed formations and plays of a football game.

An important object of the invention is to provide an improved formation display device including, an exhibiting surface having a plurality of objects held thereon by magnetic attraction, whereby said objects may be readily moved thereover without detaching said objects from said surface, the device eliminating the necessity of using chalk or other marking medium and a blackboard to demonstrate a particular formation.

A particular object of the invention is to provide an improved device for demonstrating formations which includes a metallic chart or field having a plurality of magnetized objects movable on said field, whereby the chart may be supported in a vertical position without danger of the objects falling therefrom, said objects assuming any desired shape or form so as to represent various persons or things.

Another object of the invention is to provide an improved formation display device having a plurality of objects mounted on an exhibiting surface and held in place by magnetic attraction, with means on each object for receiving chalk, or other marking medium, whereby as said object is moved on the chart, the course it has traversed during such movement is visibly marked on said chart.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a front elevation of a display device, constructed in accordance with the invention, Figure 2 is a transverse, vertical sectional view of the same, Figure 3 is a diagrammatical view, showing how the objects are moved on the field to demonstrate a play, Figure 4 is a front elevation of one of the objects which is employed, Figure 5 is an elevation of one of the objects having a piece of chalk mounted therein, and Figure 6 is a transverse, sectional view of one of the objects having a piece of chalk mounted therein.

In the drawing, the numeral 10 designates a flat sheet of metal which is shown as substantially square in shape. The sheet forms a field or exhibiting surface and is preferably constructed of a section of sheet iron, but may be constructed of any suitable metallic material. The sheet is shown as mounted in a suitable frame 11 which extends completely around the periphery thereof. If desired, the upper end of the frame may be provided with suitable hooks 12 whereby the sheet may be suspended from a suitable support in a vertical position. It will be seen that by painting the sheet black, or any other desired color, that a chart or field is provided.

A plurality of magnetized objects 13 are placed upon the chart or field and may be readily moved from place to place thereon, without detaching said objects from the field. As is clearly shown in Figure 1, a plurality of X-shaped objects A are provided to represent a football team. A similar number of circular objects B are provided to represent the opposing team. The objects may be suitably colored on their outer faces so as to be readily distinguished, although this is not essential. Any desired formation of either of the teams, represented by the objects may be clearly demonstrated.

Since each object is individually magnetized, and further since the field or chart is constructed of a metallic material, it will be obvious that each object is in itself a magnet. Thus, when the object is placed upon the field, it will adhere thereto and will be held in position by the magnetic attraction. A substantial pull or force must be exerted on the object before it can be lifted from the field. However, any one of the objects may be readily slid on the field without detaching said object therefrom. In this way it will be seen that the various positions of the objects, representing the various men on a football team, may be changed according to the particular formation which is being demonstrated. It is noted that due to the magnetic attraction between the objects and the field, the device may be supported in a vertical position, as well as in a horizontal position. It is pointed out that the hooks 12 form no part of the invention as the sheet 10 may be secured to a vertical wall in any suitable way.

In order to form the opposite poles of the magnet, which is each object, it will be seen that the objects which are made X-shaped are formed with an opening A' at their upper end (Figure 4). Of course, since the objects B are circular or ring-shaped, they have a central opening therethrough. These openings in the objects A and B are of a sufficient size so that a piece of chalk (not shown), or another marking medium may be inserted therethrough. Thus, if a complicated formation is being displayed or demonstrated, and one of the objects A, which represents a particular man, must move through a circuitous path, then a piece of chalk may be inserted through the opening A' of that object and, of course, as said object is moved across the field the path which that object has traversed will be marked by the chalk. In this way a complicated formation is more easily demonstrated.

If desired, it would be possible to make the objects A with a piece of chalk suitably supported therein. In such case, the opening A' of the object A would be threaded and a section of chalk 15 inserted therethrough. The lower end of this chalk would, of course, extend through the object A and rest upon the field when the object is located thereon. A coil spring 16 is inserted in the opening and rests on the upper end of the chalk. A thumb screw 17 is then threaded into the opening A' and bears against the upper end of the spring 16, whereby said spring exerts its pressure to hold the chalk in engagement with the field at all times. To assure a positive contact of the chalk with the field the underside of the object A may be countersunk at 18 as is clearly shown in Figure 6. In providing the object A with a piece of chalk 15 mounted therein at all times, it is obvious that when said object is moved from place to place on the field 10, that the path through which said object has moved will be marked by a chalk line. It will be obvious that the objects B which are circular in shape may have a similar piece of chalk mounted therein in the same way as shown in Figure 5.

In Figure 3, the use in demonstrating a particular formation is shown. As above explained, the X-shaped objects A represent the members of an offensive football team, while the circular shaped members B represent the members of a defensive team. It will be seen that by moving the objects A and B as shown by the dotted lines in Figure 3, that the various positions which each man on each team will take may be clearly shown. Since the objects are secured to the field 10 by magnetic attraction their movement across the field without detaching said object therefrom, may be readily accomplished. It is not necessary to remove an object from the field and to replace it in its new position because, as is well known a magnet will slide across the surface to which it is attracted. The use of the display device shown and described herein, will eliminate the necessity of the instructor employing a blackboard and chalk, as is the usual practice. The main disadvantage in using a blackboard and chalk has been that in a complicated formation the number of lines drawn to demonstrate the various movements of the men become so complicated that an understanding of the formation which is being displayed is difficult. The provision of the individual object which may be readily moved on the field 10 provides a means whereby the actual men of both teams may be represented. Their movement on the field will be exactly the same as their actual movement during the execution of the formation on the playing field. It is, of course, obvious that by representing the individual men and moving them in this way, that a demonstration of a particular formation may be simplified to a great extent. A person observing the demonstration can readily follow the movements of each object, which represents a man, and thereby clearly fix the position and movements of the various members of both the offensive and defensive teams.

It is noted that although the objects A and B have been shown as X-shaped and circular in shape, that the invention is not to be limited to any particular shape of the object. It will be seen that the objects may be made in the shape of a football player and painted accordingly when the device is to be used in displaying football formations. When displaying formations to be used by a basketball team, the objects may be formed and painted to represent basketball players. It is further pointed out that the device is not to be limited to displaying the formation of athletic teams, as it is obvious that the objects may be used to represent airplanes, war cruisers or boats, as well as men to demonstrate military maneuvers. If used for the latter purpose, the shape of the objects may vary, that is, they may be made in the shape of an airplane or boat.

From the above it will be seen that a device is provided by which any formation may be displayed or demonstrated, regardless of its nature. It is noted that very satisfactory results have been obtained without the use of the chalk in combination with the particular object and therefore, the invention is not to be limited in utilizing chalk to designate the path through which one of the objects has moved on the field. It has been found that the use of the individual object has proven very satisfactory, as it is easy for an observer to follow the particular movement of the various objects across the field.

It is further noted that the objects may be numbered or carry suitable identification letters, whereby the movement of any individual object may be more readily followed, thereby clarifying the demonstration.

What I claim and desire to secure by Letters Patent is:

1. A display device for demonstrating athletic game plays and the like, comprising, an upright metallic field and plurality of magnetic player pieces supportable upon and movable across the field with magnetic adherence thereto, said pieces being of a modified form of the horseshoe type of magnet and placed sidewise upon the field, each piece being of substantial length and breadth in field-bearing extent but of slight vertical elevation, the respective pieces having an aperture therethrough, and the inner face of the piece in the region of the aperture being countersunk, a marking element located with endwise movement in the aperture adjacent the field-abutting side of the piece, a thumb-screw in the outer portion of the aperture, and a spring element interposed in the aperture between the thumb-screw and the marking element for urging the latter into contact with the field.

2. In an apparatus for demonstrating opposed team plays of football bames and the like and including a metallic field upon which player pieces are movably supported with magnetic adherence, the respective pieces of a modified form of horseshoe type of magnet and placed on their sides on the field in use, the pieces being provided in two distinguishing sets representing the opposing teams, the pieces of one set being in split ring form and the magnetic poles of a piece being spaced apart at the split, and the pieces of the other set being polygonal and recessed at opposite sides and cut away and split at a right side to produce spaced legs the terminals of which are the magnetic poles of the piece, the form of the respective pieces making it possible to move the flatwise placed pieces on the field from one position to another and into close relation to each other without magnetic influence of one upon the other, the opposite marginal recessing of the polygonal piece distinguishing it from the circular piece in appearance and affording an interfitting relation to indicate an intimate engagement of the opposed pieces in the play.

VICTOR C. HURT.